(12) United States Patent
Bouarroudj et al.

(10) Patent No.: US 10,033,235 B2
(45) Date of Patent: Jul. 24, 2018

(54) PLATES FOR RETENTION OF MAGNETS

(71) Applicant: VALEO EQUIPEMENTS ELECTRIQUES MOTEUR, Creteil (FR)

(72) Inventors: Lilya Bouarroudj, Charenton le Pont (FR); Mamy Rakotovao, Vitry sur Seine (FR); Jean-Claude Matt, Dijon (FR)

(73) Assignee: Valeo Equipments Electriques Moteur, Creteil (FR)

( * ) Notice: Subject to any disclaimer, the term of this patent is extended or adjusted under 35 U.S.C. 154(b) by 190 days.

(21) Appl. No.: 15/035,292

(22) PCT Filed: Nov. 17, 2014

(86) PCT No.: PCT/FR2014/052938
§ 371 (c)(1),
(2) Date: May 9, 2016

(87) PCT Pub. No.: WO2015/075364
PCT Pub. Date: May 28, 2015

(65) Prior Publication Data
US 2016/0294237 A1    Oct. 6, 2016

(30) Foreign Application Priority Data
Nov. 20, 2013 (FR) ..................... 13 61402

(51) Int. Cl.
*H02K 1/28* (2006.01)
*H02K 1/27* (2006.01)

(52) U.S. Cl.
CPC ............. *H02K 1/28* (2013.01); *H02K 1/274* (2013.01); *H02K 1/2773* (2013.01)

(58) Field of Classification Search
CPC ............ H02K 1/14; H02K 1/146; H02K 1/18; H02K 1/27; H02K 1/277; H02K 1/2773; H02K 1/28; H02K 21/12; H02K 21/14
See application file for complete search history.

(56) References Cited

U.S. PATENT DOCUMENTS 6,847,149 B2 * 1/2005 De Filippis ............ H02K 29/03
310/216.008
6,897,597 B1    5/2005 Armiroli et al.
(Continued)

FOREIGN PATENT DOCUMENTS

DE    2346345    3/1975
DE    102011080948    2/2013
(Continued)

*Primary Examiner* — Tran Nguyen
(74) *Attorney, Agent, or Firm* — Berenato & White, LLC

(57) ABSTRACT

A rotor for an electric machine comprises a central core, arms extending radially relative to the core, these arms each comprising two rims extending on either side of the arms, permanent magnets positioned inside housings that are delimited by opposing lateral faces of adjacent arms, an outer face of the core extending between adjacent arms, and the rims of the arms of the rotor. Plates made from a material more flexible than the permanent magnets are positioned between the rims of the arms and the face of the permanent magnet facing away from the axis of the rotor to hold the magnets. The plate having, in the axial direction, a height close to the height of the permanent magnets, the ratio between the width of the plate and that of the magnet being between 0.9 and 1.1, without being equal to 1.

20 Claims, 6 Drawing Sheets

(56) References Cited

U.S. PATENT DOCUMENTS

| | | | | |
|---|---|---|---|---|
| 8,669,682 B2* | 3/2014 | Matt | ............... | H02K 1/2773 |
| | | | | 310/156.53 |
| 2009/0096308 A1* | 4/2009 | Staudenmann | ...... | H02K 1/2773 |
| | | | | 310/156.08 |
| 2011/0316378 A1* | 12/2011 | Matt | ............... | H02K 1/2773 |
| | | | | 310/156.53 |
| 2012/0038237 A1* | 2/2012 | Li | ................. | H02K 1/146 |
| | | | | 310/156.45 |
| 2013/0038161 A1* | 2/2013 | Pan | ............... | H02K 1/2773 |
| | | | | 310/156.01 |
| 2013/0038165 A1* | 2/2013 | Pan | ............... | H02K 21/16 |
| | | | | 310/156.48 |
| 2013/0221787 A1* | 8/2013 | Kritharidou | ............ | H02K 1/17 |
| | | | | 310/154.14 |

FOREIGN PATENT DOCUMENTS

| | | |
|---|---|---|
| EP | 0831580 | 3/1998 |
| EP | 1865200 | 12/2007 |
| EP | 2372874 | 10/2011 |
| FR | 2784248 | 4/2000 |
| FR | 2856532 | 12/2004 |

* cited by examiner

PLATES FOR RETENTION OF MAGNETS

CROSS-REFERENCE TO RELATED APPLICATIONS AND CLAIM TO PRIORITY

This application is a national stage application of International Application No. PCT/FR2014/052938 filed Nov. 17, 2014, which claims priority to French Patent Application No. 1361402 filed Nov. 20, 2013, the disclosures of which are incorporated herein by reference and to which priority is claimed.

FIELD OF THE INVENTION

The invention relates to a rotor for an electrical machine, as well as to the spring for radial retention of an associated permanent magnet.

The invention has a particularly advantageous, but not exclusive, application with compressors which are used for compression of motor vehicle air conditioning coolant fluid.

BACKGROUND OF THE INVENTION

Electrical machines are known comprising a stator and a rotor integral with a shaft which ensures the movement of a spiral compressor also known as a "scroll compressor". A system of this type comprises two interposed spirals, such as blades, in order to pump and compress the coolant fluid. In general, one of the spirals is fixed, whereas the other is displaced eccentrically without rotating, such as to pump, then trap, and finally compress pockets of fluid between the spirals. A system of this type is described for example in document EP1 865 200.

The rotor made of laminated plate comprises a central core, and arms which extend radially relative to the core. These are each comprise two rims which extend circumferentially on both sides of the arms. Permanent magnets are positioned inside receptacles, which are each delimited by two faces opposite one another of two adjacent arms, an outer face of the core of the rotor, and the rims of the arms.

When the tolerances used in the production of the rotor are high in order to reduce the production costs, it is possible for the magnets to be badly placed inside the receptacles of the rotor. This can give rise to various problems:
a. Mechanical imbalance if the magnets are not all in the same radial position.
b. Greater stresses on the parts of the magnets which are in contact with the rotor plate, in particular under the effect of high-speed centrifugal forces. Under the effect of these forces, and as a result of an irregularity of the contact surface, a very high level of stress can be generated in the magnet, causing it to break or split.
c. Small fragments of magnet can be ejected from the rotor, and damage the stator under the effect of the centrifugal forces.

In addition, one of the problems of these machines is the retention of the magnets during centrifugation.

SUMMARY OF THE INVENTION

The objective of the invention is to eliminate these disadvantages.

For this purpose, use is made of plates positioned between the rims of the arms of the rotor and the face of the permanent magnet which faces on the side opposite the axis of the rotor. These plates enclose the rotor above the magnet and prevent potential ejection of fragments of magnet. In addition, the nature of the material selected for these plates makes it possible, by compression of the plates under the effect of the centrifugal forces, to distribute better the forces of retention of the magnets during centrifugation on the surface of the magnet in contact with the plate. This effect makes it possible to reduce considerably the local mechanical stresses in the magnet, thus making it possible to prevent its breakage or splitting at high speed.

The invention thus relates to a rotor for an electrical machine, the said rotor being provided with an axis of rotation and comprising:
  a central core;
  arms which extend radially relative to the core, these arms each comprising two rims which extend on both sides of the arms;
  permanent magnets positioned inside receptacles which are each delimited by two lateral faces opposite one another of the two adjacent arms, an outer face of the core extending between the two adjacent arms, and the rims of the arms of the rotor.

According to a general characteristic, the rotor comprises plates which are made of a material more flexible than the permanent magnets positioned between the rims of the arms and the face of the permanent magnet which faces on the side opposite the axis of the rotor, in order to retain the magnets during centrifugation, and the permanent magnets have a length in the axial direction, and a width in the orthoradial direction, the plate having in the axial direction a length which is close to the length of the permanent magnets. For example, a ratio between the length of the plate and the length of the magnets is between 0.9 and 1.1, the value 1 being excluded. For another example, a ratio between the width of the plate and the width of the magnets is between 0.9 and 1 (1 not being included). For example the ratio between the length of the plate and the length of the magnets is between 1 and 1.1 (1 not being included).

A plate with a height which is substantially equal to, but greater than, that of the magnet permits increased retention.

According to one characteristic, the orthoradial direction has a width close to the width of the permanent magnets. For example, the ratio between the length of the plate and that of the magnets is between 0.9 and 1.1, the value 1 being excluded. For another example, the ratio between the width of the plate and the width of the magnets is between 0.9 and 1.1, the value 1 being excluded. For example, the ratio between the width of the plate and the length of the magnets is between 0.9 and 1 (1 not being included). For example the ratio between the width of the plate and the length of the magnets is between 1 and 1.1 (1 not being included).

A plate with a height which is substantially equal to, but greater than, that of the magnet permits increased retention.

According to one embodiment, the thickness of the plates is between 0.1 and 0.5 mm, and preferably equal to 0.3 mm.

According to one embodiment, the plates contain glass fibre and/or epoxy resin, or they are made of plastic material or magnetic or non-magnetic metal.

According to one embodiment, the arms extend radially relative to the core according to a radius of curvature, and the ratio between the width at the base of the arms and the said radius of curvature is equal to 1 or less.

According to one embodiment, the at least one of the arms has a recess between the radial extension of the arm and each of its two rims.

According to one embodiment, the rotor additionally comprises springs which are positioned inside receptacles between the outer face of the core and a face of the magnet which faces towards the axis of the rotor, with these springs ensuring retention of the permanent magnet inside its receptacle against the rims of the arms of the rotor, by exerting by deformation a radial force on the permanent magnet from the interior towards the exterior of the rotor.

Thus, springs are used which are positioned inside receptacles between the outer face of the core and a face of the magnet which faces towards the axis of the rotor. These springs ensure retention of the magnet inside its receptacle, against the rims of the arms of the rotor, by exerting a by deformation a radial force on the magnet from the interior towards the exterior of the rotor. The invention thus makes it possible to guarantee good placing of the magnet inside its receptacle irrespective of the speed of rotation of the rotor.

According to one embodiment, the springs work in an elasto-plastic domain.

According to one embodiment, the springs each have at least one linear contact with one of the elements against which the spring is supported, and at least one linear contact with the other element against which the spring is supported.

According to one embodiment, the springs each comprise a rounded central portion, and two rounded end portions which are situated on both sides of the rounded central portion, the rounded central portion and the rounded end portions having inverse curvatures.

According to one embodiment, the rotor additionally comprises plates which are made of a more flexible material than the permanent magnets which are positioned between the rims of the arms and the face of the permanent magnet which faces on the side opposite the axis of the rotor.

The invention also relates to the spring for the radial retention of permanent magnets as such, characterised in that it comprises:
 a rounded central portion; and
 two rounded end portions which are situated on both sides of the rounded central portion;
 the rounded central portion and the rounded end portions having inverse curvatures.

BRIEF DESCRIPTION OF THE DRAWINGS

The invention will be better understood by reading the following description and examining the figures which accompany it. These figures are provided purely by way of illustration of the invention which is in no way limiting.

Elements which are identical, similar or analogous retain the same reference from one figure to another.

DETAILED DESCRIPTION OF THE PREFERRED EMBODIMENT(S)

Figure 1:
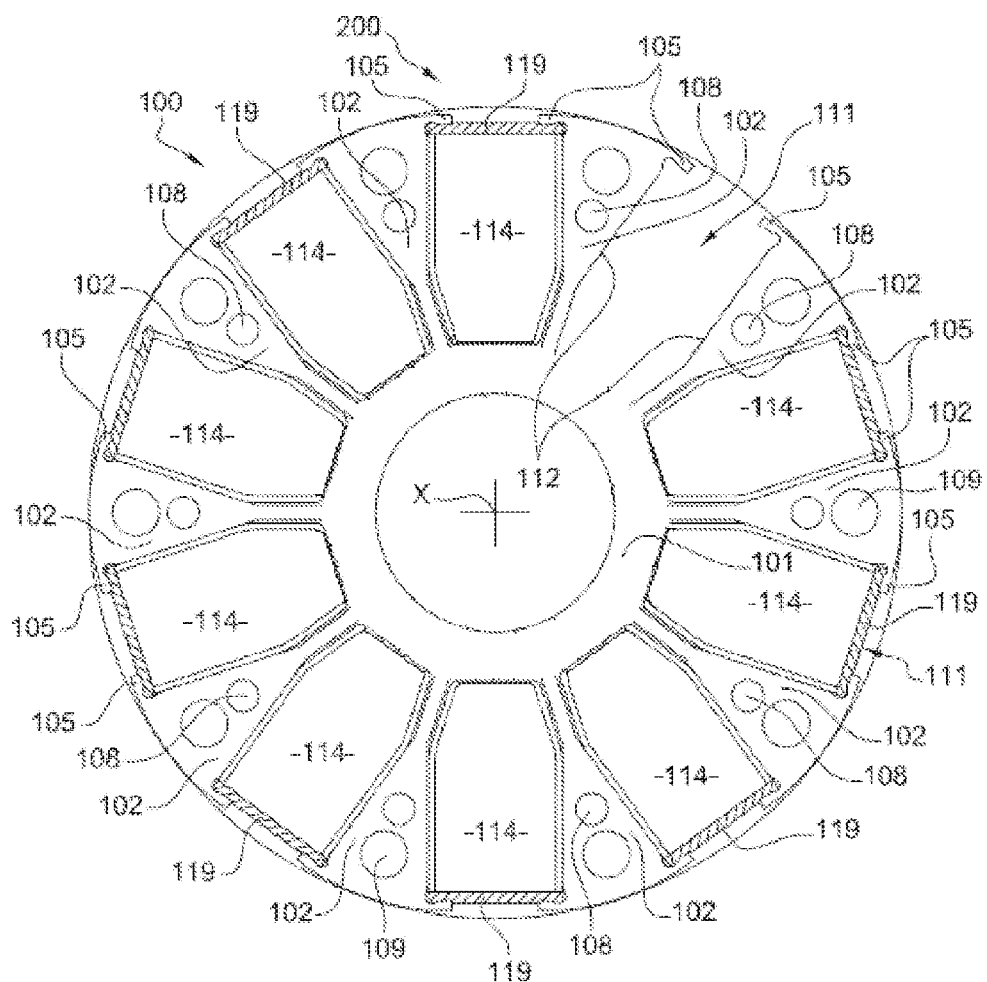
FIGS. 1 and 2A show a view from above of the rotor according to the invention without one of its flanges.

FIG. 1 shows a rotor 100 according to the invention with an axis X which is designed to be fitted on a shaft (not represented). This rotor with permanent magnets belongs to a rotary electrical machine, which can be a compressor used for the compression of motor vehicle air conditioner coolant fluid. As a variant, this can be an electric motor or an alternator. The shaft can be a drive shaft or a driven shaft. In a known manner, the electrical machine comprises a stator, which can be polyphase, surrounding the rotor. This stator is supported by a housing which is configured to rotate the shaft via ball bearings and/or needle bearings, as can be seen for example in the aforementioned document EP 1 865 200.

The rotor 100 is formed by a stack of plates which extend on a radial plane perpendicular to the axis X. The set of plates forms the body of the rotor 100 and is made of ferromagnetic material. In this case, this set of plates comprises a central core 101 and arms 102 which extend radially and axially from the core 101 relative to the axis X. These arms 102 each comprise at their free end two rims 105 which extend circumferentially on both sides of the arms 102. The purpose of the rims 105 is to retain permanent magnets 114 of the rotor in the radial direction. The rims 105 are implanted on the outer periphery of the rotor 100.

According to one embodiment, the arms 102 are integral with the core 101. As a variant, all the arms 102 or only some of them are added onto the core 101, for example by a connection of the tenon-mortise type as described in document FR2856532. On a radial plane, the plates of the rotor 100 all have an identical contour. The contour of the plates is cut out in a globally circular form, and comprises the arms 102 which are distributed regularly according to a radial direction towards the outer periphery. The plates are retained by means of rivets 108 which are positioned on the same circumference of the body of the rotor 100, and pass axially from one side to the other of the stack of plates via openings (with no reference) for formation of an assembly which can be handled and transported. The body also comprises openings (with no reference) in order to receive tie rods 109 for assembly of two flanges 200 (FIG. 5) which are placed on both sides of the rotor on its radial end faces. These flanges can be used to ensure balancing of the rotor 101. The flanges 200 are made of non-magnetic material, for example aluminium. The rivets 108 and the tie rods 109 are advantageously made of non-magnetic material such as stainless steel. The tie rods 109 have a diameter which is larger than that of the rivets 108, and are implanted around a circumference with a diameter larger than that of the rivets. In this case, the number of tie rods is equal to the number of rivets.

The rotor 100 comprises receptacles 111 which are designed to receive the permanent magnets 114. The magnets can be made of rare earth or ferrite according to the applications and the power required for the rotary electrical machine. More specifically, the receptacles 111 are each delimited by two lateral faces 112 opposite one another of two adjacent arms 102, with an outer face of the core 101 extending between the two arms 102, and faces of the rims 105 which face towards the core 101 belonging to the two adjacent arms 102. These receptacles 111 are thus blind, whilst being open at their outer periphery.

The receptacles 111 have a form complementary to that of the magnets 114 which have a parallelepiped form with two angles bevelled at their inner periphery. The magnets 114 thus have a reduced cross-section at one of their ends. The side of the magnets 114 with bevelled angles is situated on the side of the shaft of the rotor 100. The lateral faces of the arms 102 are each formed by a first plane which extends globally radially relative to the axis X which is designed to be opposite a bevelled angle of the magnet 114. The lateral faces of the arms 102 comprise a second plane which is inclined relative to the first plane, such that two second planes opposite one another of a single receptacle are parallel to one another and opposite two longitudinal faces of the magnet 114. In this case, the rotor 100 comprises ten magnets 114 which are inserted in ten receptacles 111 with complementary forms. In order to introduce a magnet 114 into its receptacle or extract it from its receptacle, it is possible for example to make it slide parallel to the axis X of the rotor 100. For the sake of greater clarity, in FIG. 1 one of the magnets has been eliminated in order to show better the faces of a receptacle 111. It is apparent from the foregoing and from FIG. 1 that firstly, each arm 102 comprises a first portion, globally with a constant width, obtained from the core 101, extended by a second portion which widens in the direction opposite the axis X and ends in the rims 105, and that secondly, the magnets 114 occupy to the maximum the space available in the rotor. The machine can thus have the maximum power whilst being compact radially. A solution is obtained with concentration of flux, with the lateral faces opposite one another of two consecutive magnets having the same polarity. In this embodiment, the rotor has a length of 41 mm and a diameter of 61 mm. It will be appreciated that this depends on the applications.

In other words, the rotor which is represented in the figure is a rotor 100 which is provided with an axis of rotation X, and comprises:

a central core 101;

arms 102 which extend radially relative to the core 101, these arms 102 each comprising two rims 105 which extend on both sides of the arms 102;

permanent magnets 114 which are positioned inside receptacles 111 each delimited by two lateral faces opposite one another of the two adjacent arms 102, an outer face of the core 101 extending between the two adjacent arms, and the rims 105 of the arms of the rotor 100.

For each magnet, the rotor 100 comprises a plate 119 or small plate made of a material which is softer and more flexible than the magnets 114. The plate 119 is a rectangular plate.

The plates 119 are made of a material which is more flexible than the permanent magnets 114 and are positioned between the rims 105 of the arms 102 and the face of the permanent magnet 114 which faces on the side opposite the axis X of the rotor 100. In the case of permanent magnets 114, these have a length in the axial direction and a width in the orthoradial direction (i.e., direction perpendicular to the radial direction), the plates 119 have a length in the axial direction which is close to the length of the permanent magnets 114, without being equal to it, and they have a width in the orthoradial direction which is close to the width of the permanent magnet 114 without being equal to it. For example, the ratio between the length of the plate 119 and the length of the permanent magnets 114 is between 0.9 and 1.1, the value 1 being excluded. Therefore, the ratio of the length of the plate 119 and the length of the permanent magnet 114 has two ranges: $0.9 \leq ratio < 1$ and $1 < ratio \leq 1.1$. In other words, the length of the plate 119 and the length of the permanent magnet 114 are not equal. For another example, the ratio between the width of the plate 119 and the width of the permanent magnets 114 is between 0.9 and 1.1, the value 1 being excluded. Therefore, the ratio of the width of the plate 119 and the width of the permanent magnet 114 has two ranges: $0.9 \leq ratio < 1$ and $1 < ratio \leq 1.1$. In other words, the width of the plate 119 and the width of the permanent magnet 114 are not equal.

The plates are made of glass fibre and/or epoxy resin. For example, in the case of a combination of glass fibre and epoxy resin, the density of the plate is between 1.8 and 2 g/cm$^3$. The plates can be made of simple or filled plastic materials, composite materials filled with glass or carbon fibre, or of metal alloys.

In this combination, it is possible for the volume of glass fibre to represent 50 to 60% of the volume of the plate. In this case a plate is obtained with resistance to flexion at 23° C. of more than 640 Mpa, a modulus of elasticity at 23° C. of more than 33,000 Mpa, and resistance to compression at 23° C. of more than 690 Mpa.

It is also possible for the volume of glass fibre is in this combination to represent 68 to 78% of the volume of the plate. In this case a plate is obtained with resistance to flexion at 23° C. of more than 600 Mpa, a modulus of elasticity at 23° C. of more than 22,000 Mpa, and resistance to compression at 23° C. of more than 300 Mpa.

Alternatively, the plates 119 can be made of plastic material.

Each plate 119 is positioned between the inner faces of two rims 105 which face towards one another and the outer face of the magnets 114 which is oriented in the direction opposite the axis X. If appropriate, although this is not compulsory, a layer of adhesive which is more flexible than the magnet 114 is interposed between the magnet 114 and the plate 119. For further details concerning the plate, reference will be made to document FR2784248. The plates 119 close the receptacles 111, and constitutes plates for retention of the magnets 114 in contact with the outer periphery of the latter.

The purpose of the plates is, during the insertion of the rotor, to prevent any dust from being introduced into the fluid situated in the environment of the electrical machine. They also make possible resistance to centrifugation of the permanent magnets during the operation (i.e., rotation) of the rotor 100. This retention is all the more important in the case of ferrite magnets which, for the same remnant field, have a mass which is greater than that of the rare earth magnets.

For example, the thickness of the plates 119 measured in the radial direction is between 0.1 and 0.5 mm, and is preferably equal to 0.3 mm.

Figure 2A:
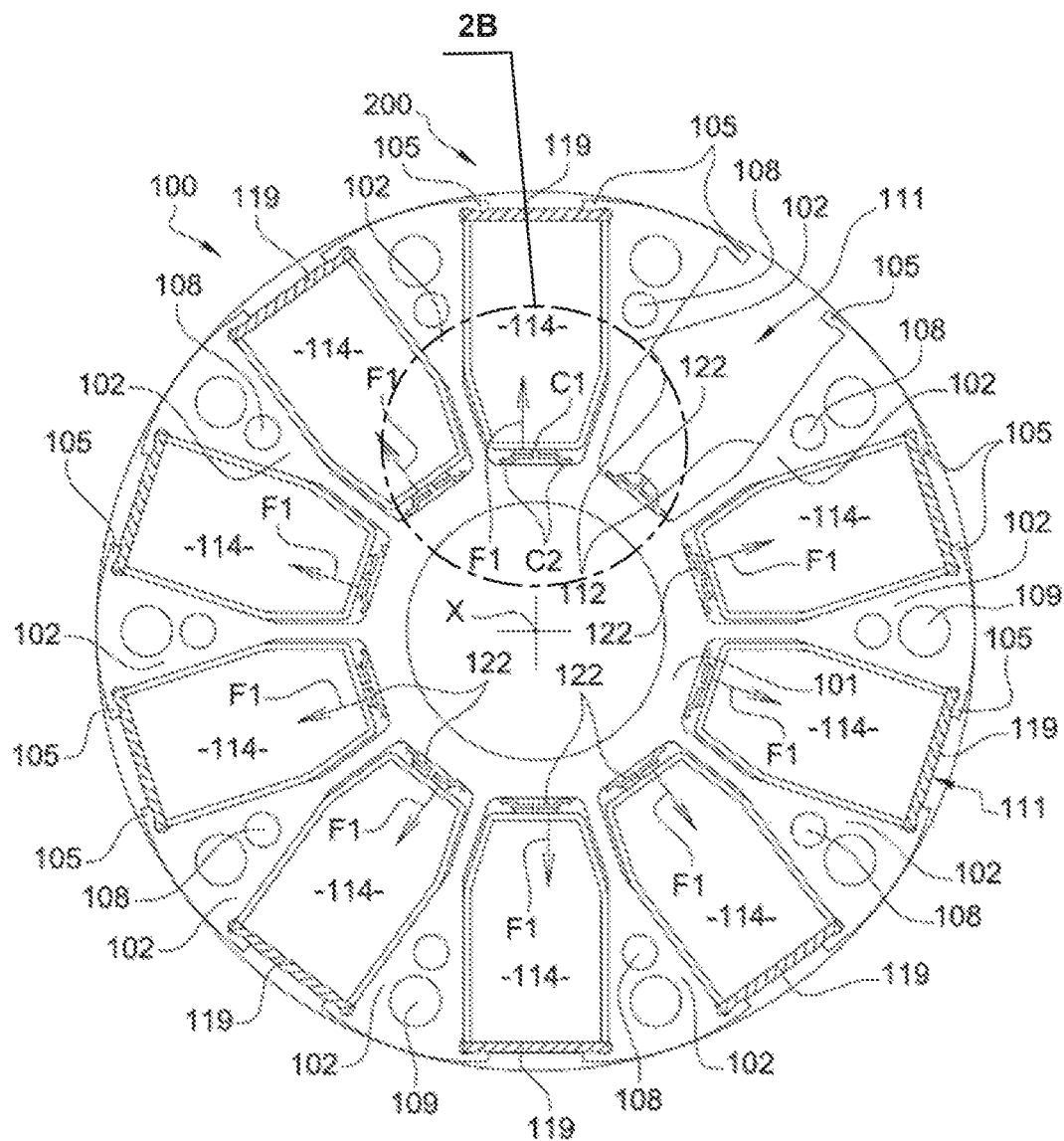
Figure 2B:
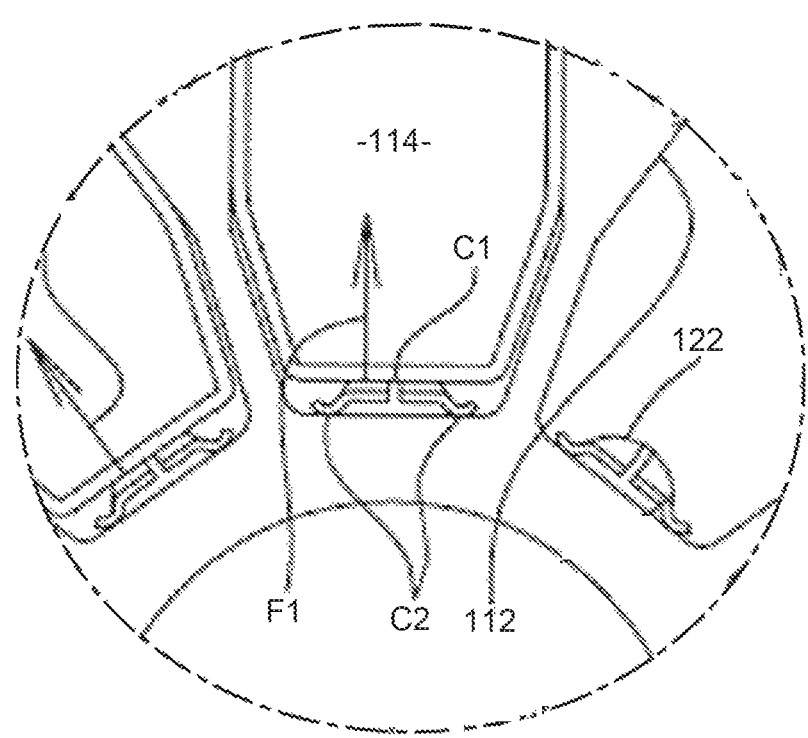
FIG. 2B is an enlarged view of a fragment of the rotor shown in the circle "2B" of FIG. 2A.

The rotor in FIG. 2 is distinguished from that in FIG. 1 in that it comprises springs 122. These springs permit retention of the magnets 114 inside their receptacle 111 against the rims 105 via the plates 119, and the rotor 100 comprises the springs 122 which exert a radial force by deformation on the magnet 114 from the interior towards the exterior of the rotor 100. For this purpose, the springs 122 are positioned between the inner face of the magnet 114 which faces on the side of the axis X and the base of the receptacle 111 constituted by the face of the core 101 which extends between two successive arms 102. The base of the receptacle 111 has a flat form in order to facilitate the support of the springs 122 against the base.

In the case when the rotor comprises springs, in addition to the functions previously described, the plate 119 then also fulfils the function of distributing the forces applied by the springs 122.

Figure 3:
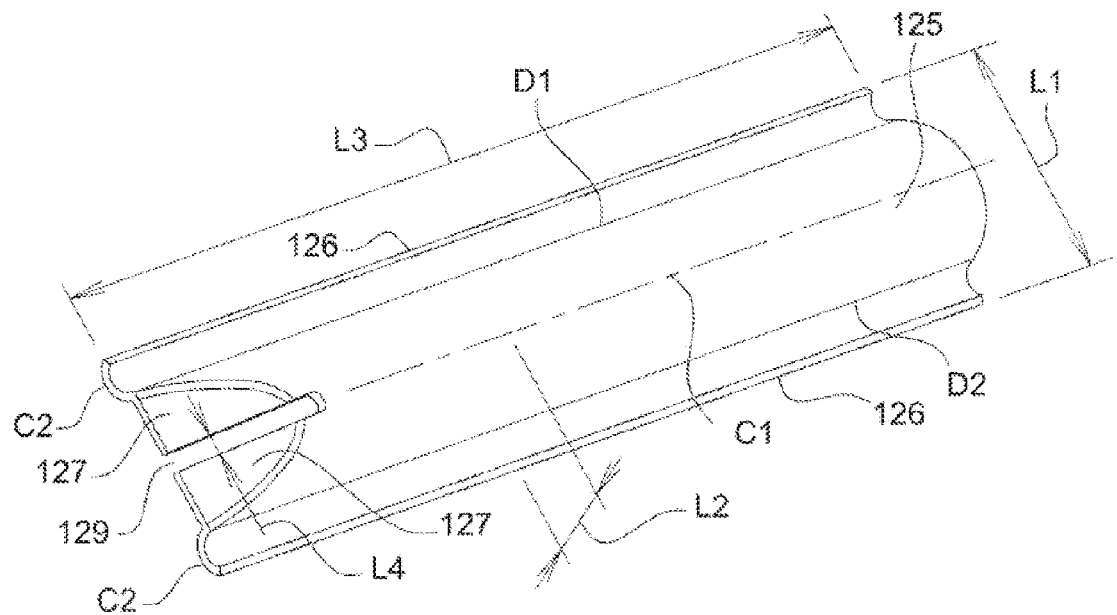
FIG. 3 shows a view in perspective of the spring according to the invention.
Figure 4A:
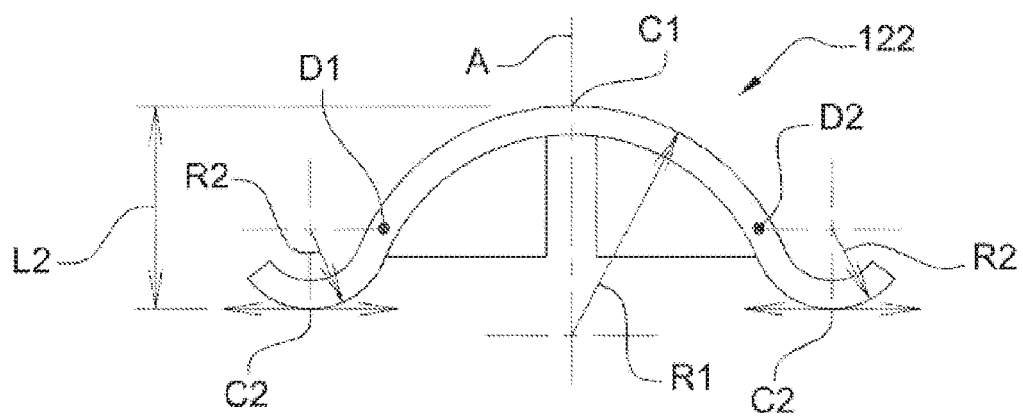
FIGS. 4a-4c show views from the front, from the side and from above, of the spring according to the invention.
Figure 4B:
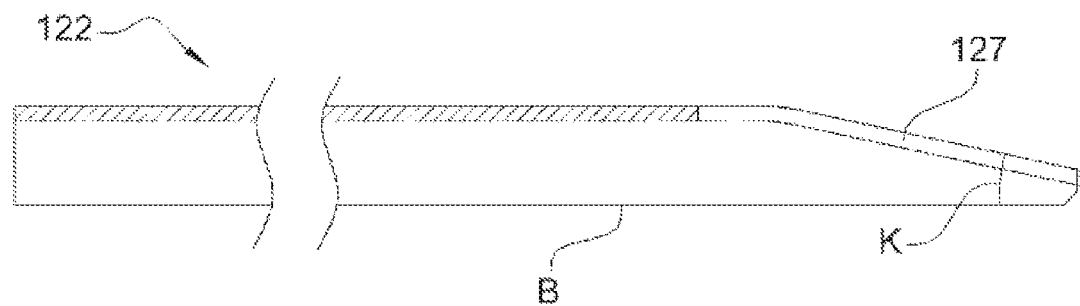
Figure 4C:
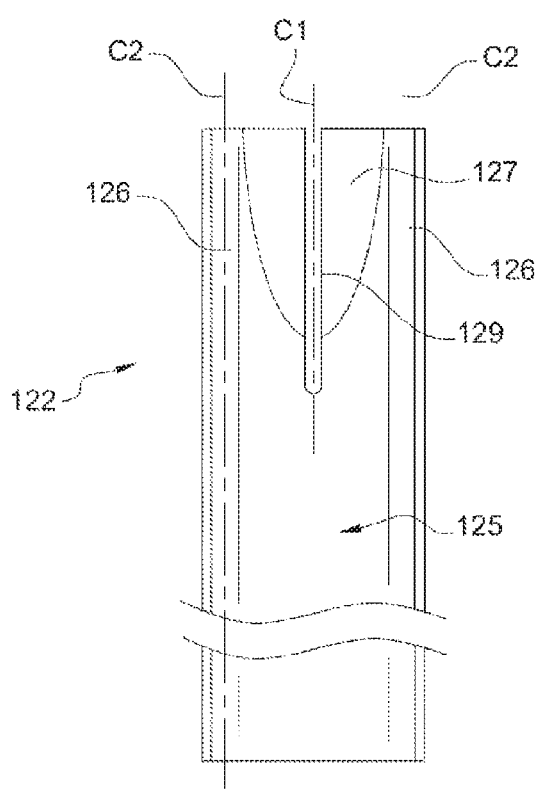

As can be seen clearly in FIGS. 3 and 4, each spring 122 comprises a rounded central portion 125 and two rounded end portions 126 which are situated on both sides of the rounded central portion 125. The rounded central portion 125 and the rounded end portions 126 have inverse curvatures. In fact, inflexion lines D1, D2 exist which are situated between the central portion 125 and each end portion 126, in the position of the change of curvature between the central portion 125 and the end portions 126. The spring 122 is symmetrical relative to a vertical plane A which passes via an end of the central portion where the tangent to the curve of the spring 122 is horizontal (cf. FIG. 4a).

The radius of curvature R1 of the central portion 125 is larger than the radius of curvature R2 of the end portions 126. Preferably, the radius R1 of curvature of the central portion 125 is approximately three times larger than the radius R2 of curvature of the end portions 126.

In the free state, i.e. when they are not compressed, the springs 122 have a width L1 in the orthoradial direction, which is smaller than a space between two arms 102 at the level of the central core 101, and a height L2 in the radial direction, which is slightly greater than the difference between the central core 101 and the face of the permanent magnet 114 which faces towards the axis X. A length L3 of the springs 122 in the axial direction is substantially equal to the axial length of the rotor 100.

Each spring 122 preferably has an end 127 which is bevelled according to a longitudinal direction of the spring 122, in order to facilitate the insertion of the spring 122 between a magnet 114 and an inner face of a receptacle 111 of the said magnet 114.

Each spring 122 additionally comprises a slot 129 along the bevelled end 127, in order to reduce the rigidity of the said bevelled end 127 and thus retain the effect of the spring. The slot 129, with a width L4, extends between two inclined flat parts which form the bevelled end 127. Preferably, the slot 129 extends along a length which is slightly greater than the length according to which the bevelled end 127 extends.

During the assembly, the permanent magnets 114 with the plates 119 having previously been introduced into the receptacles 111, the springs 122 are inserted between two adjacent arms 102 via their bevelled end 127 between the face of the magnets 114 and the core 101 of the rotor.

Preferably, as shown in FIG. 2, the spring 122 is positioned such that the convexity of the central portion 125 is positioned on the side of the inner face of the magnet 114, whereas the convexity of the end portions 126 is on the side of the core 101 of the rotor 100.

The spring 122 then has an axially extending (i.e., extending in the axial direction) linear contact C1 with one of the elements against which it is supported, in this case the face of the magnet 114, via the central portion 125, and two axially extending additional linear contacts C2 with the other element, in this case the base of the receptacle 111, via the end portions 126. In other words, both the linear contact C1 and the additional linear contacts (C2) extend axially along the length of the permanent magnet 114. Alternatively, it would be possible to overturn the springs 122, such that they have an axially extending linear contact with the base of the receptacle 111, and two axially extending linear contacts with the face of the magnet 114.

With the height of the space between the magnet 114 and core 101 being smaller than the height L2 of the spring, this insertion of the spring 122 between the core 101 and the magnet 114 tends to compress the spring 122 according to its height, which has the effect of spacing the ends of the spring 122 from one another. By reaction, the spring 122 thus deformed then tends to exert a radial force F1 from the interior towards the exterior of the rotor on the magnet 114, such as to keep it supported against the rims 105 (cf. FIG. 1). The springs 122 preferably work in an elasto-plastic domain, in order to limit the stresses sustained by the springs 122. In addition, the width L1 of the spring 122 depends on the width of the base of the associated receptacle 111, such that the compressed spring does not come into contact with the edges of the base of the receptacle, in order to work in good conditions. This spring 122 eliminates the play, such that the production tolerances can be extensive. According to another embodiment, the receptacles 111 have a constant width which is equal to the width of the base of the receptacle 111 in FIG. 1. The same applies to the magnets 114 fitted in the receptacles 111, the arms being wider at the level of the core 101. The electrical machine in this embodiment is then less powerful, with the springs 122 being retained, whereas the magnets 114 are less wide.

According to one embodiment, the springs 122 can be made of stainless steel, or of any other material which is suitable for the retention function required. According to one non-limiting embodiment, each spring 122 has a width L1 of approximately 5 mm, a height L2 of approximately 1.5 mm, and a length L3 of approximately 40 mm. The radius of curvature R1 of the central portion 125 is approximately 1.8 mm, whereas the radius of curvature R2 of the end portions is approximately 0.6 mm. The slot 129 has a width L4 of approximately 0.4 mm. The bevelled end 127 forms an angle K of approximately 12° relative to a horizontal plane B which passes via an end of the central portion 125 (cf. FIG. 4b).

It will be appreciated that persons skilled in the art can modify the dimensions and the configuration of the rotor 100 or of the spring 122 described in the figures, without departing from the context of the invention. Thus, in particular, in an equivalent manner, in the place of the rounded forms of the central portion 125 and of the end portions 126, the spring 122 can have forms in the shape of a triangle (forms in the shape of a "V"), or forms in the shape of a "U".

The terms "horizontal" and "vertical" are understood relative to a spring 122 with its two end portions 126 supported on a flat surface, with the central portion 125 facing upwards.

It will be appreciated that the present invention is not limited to the embodiments described. Thus, the number of magnets and of receptacles can be more or less than ten, depending on the applications. The core 101 of the set of plates can be connected in rotation to the shaft of the rotary electrical machine in different ways. For example, the shaft can comprise a knurled portion, and be harder than the plates of the body of the rotor. In this case, in a known manner, the shaft is forced inside the central opening in the rotor delimited by the core. As a variant, the connection in rotation can be created by means of a key device which intervenes between the outer periphery of the shaft and the inner periphery of the core. As a variant, the connection in rotation is created via a central hub which is ribbed on the interior for its connection with the shaft.

The aforementioned flanges can ensure globally sealed fitting of the rotor in association with the plates 119. These flanges can comprise projections which are provided with blind holes for fitting of balancing weights in appropriate locations, as described in document DE 2 346 345, to which reference will be made.

Figure 5:
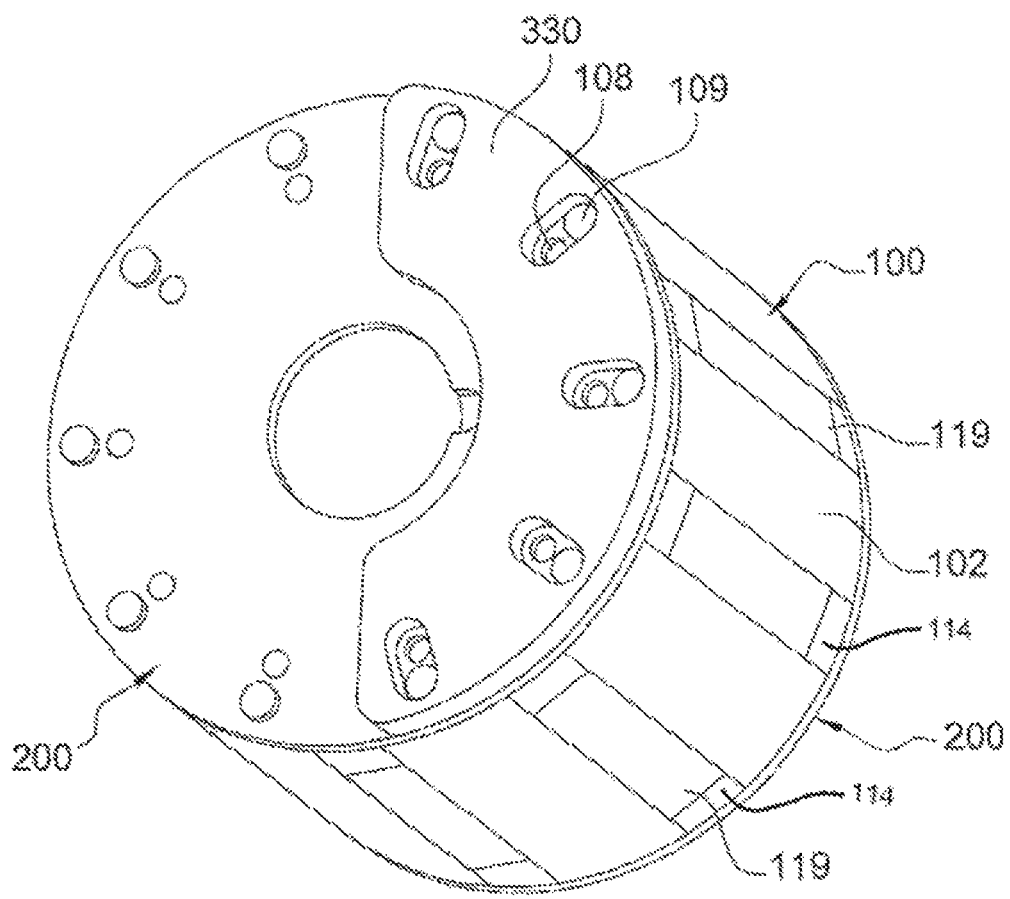
FIG. 5 is a view in perspective of the rotor equipped with its flanges with balancing weights.

As a variant, each flange 200 can support a balancing weight 330 in the form of a half ring, one of which can be seen in FIG. 5, without modification of the implantation of the rivets 18 and of the tie rods 109. The two rings are globally diametrically opposite, and each have hollows for receipt of the heads of the rivets 108 and the tie rods 109, as can be seen in FIG. 5. The hollows have an oblong form. The balancing weights 330 can be made of brass. As a variant, the same applies to the flanges 200.

The rotor shaft can drive the blades of the compressor directly. The rotor and the stator can be cooled by the coolant fluid.

The rotary electrical machine provided with a rotor according to the invention can comprise a polyphase stator, for example of the three-phase type, the outputs of the phases of which are connected in a known manner to a control inverter of the machine, as described for example in application EP 0 831 580, to which reference will be made.

It is apparent from the description and the drawings that the spring 122 is compact radially, and has a bevelled end 127 which facilitates its insertion between the magnet 114 and the core 101. This spring 122 works in good conditions, since it works in an elasto-plastic domain without coming into contact with the edges of the flat base of the receptacle 111 concerned. This spring 122 with a rounded form works in a resilient manner, and has a reduced number of support points, in this case three of them.

As a variant, the number of magnets 114 can be less than the number of receptacles, depending on the power required for the rotary electrical machine. For example, two diametrically opposite receptacles can be empty. As a variant, the magnets can be of a different grade in order to reduce the costs. For example, at least two diametrically opposite receptacles can be equipped with ferrite magnets, and the other receptacles are equipped with rare earth magnets which are more powerful but more costly.

The invention claimed is:

1. A rotor (100) for an electrical machine, the rotor having an axis of rotation (X) and comprising:
   a central core (101);
   arms (102) extending radially relative to the central core (101), each of the arms (102) comprising two rims (105) extending on both sides of the arms (102);
   permanent magnets (114) positioned inside receptacles (111), each of the receptacles (111) delimited by two lateral faces (112) opposite one another of the two adjacent arms (102), an outer face of the central core (101) extending between the two adjacent arms (102) and the rims (105) of the arms (102); and
   plates (119) of a material more flexible than the permanent magnets (114), and positioned between the rims (105) of the arms (102) and a face of the permanent magnet (114) facing on the side opposite the axis of rotation (X) of the rotor (100), in order to retain the permanent magnets inside the receptacles (111) during centrifugation,
   each of the permanent magnets having a length in the axial direction and a width in the orthoradial direction,
   each of the plates (119) having a length in the axial direction not being equal to the length of each of the permanent magnets,
   a ratio of the length of each of the plates (119) to the length of each of the permanent magnets (114) being between equal or more than 0.9 and less than 1 or between more than 1 and equal or less than 1.1.

2. The rotor according to claim 1, wherein each of the plates (119) has a width in the orthoradial direction not being equal to the width of each of the permanent magnets (114), and wherein a ratio of the width of each of the plates (119) to the width of each of the permanent magnets (114) is between equal or more than 0.9 and less than 1 or between more than 1 and equal or less than 1.1.

3. The rotor according to claim 1, wherein a thickness of each of the plates (119) in the radial direction is between 0.1 and 0.5 mm.

4. The rotor according to claim 1, wherein the plates are made of one of simple or filled plastic materials, composite materials filled with glass or carbon fiber, and metal or metal alloys.

5. The rotor according to claim 1, wherein the arms (102) extend radially outwardly relative to the central core (101), and wherein a ratio between a width at a base of the arms and a radius of curvature is equal to or less than 1.

6. The rotor according to claim 1, further comprising springs (122) positioned inside the receptacles (111) between the outer face of the central core (101) and a face of the permanent magnet (114) facing towards the axis (X) of the rotor (100), wherein the springs (122) assure retention of the permanent magnet (114) inside the associated receptacle (111) against the rims (105) of the arms of the rotor by exerting by deformation a radial force (F1) on the permanent magnet (114) from the interior towards the exterior of the rotor (100).

7. The rotor according to claim 6, wherein the springs (122) work in an elasto-plastic domain.

8. The rotor according to claim 6, wherein each of the springs (122) has at least one linear contact (C1) with one of the permanent magnet (114) and the central core (101) against which the spring (122) is supported, and at least one additional linear contact (C2) with the other one of the permanent magnet (114) and the central core (101) against which the spring is supported, and wherein both the at least one linear contact (C1) and the at least one additional linear contact (C2) of each of the springs (122) extend axially along the length of the permanent magnet (114).

9. The rotor according to claim 6, wherein each of the springs (122) comprises a rounded central portion (125) and two rounded end portions (126) situated on both sides of the rounded central portion (125), and wherein the rounded central portion (125) and the rounded end portions (126) have inverse curvatures.

10. The rotor according to claim 2, wherein a thickness of each of the plates (119) in the radial direction is between 0.1 and 0.5 mm.

11. The rotor according to claim 2, wherein the plates are made of one of simple or filled plastic materials, composite materials filled with glass or carbon fiber, and metal or metal alloys.

12. The rotor according to claim 3, wherein the plates are made of one of simple or filled plastic materials, composite materials filled with glass or carbon fiber, and metal or metal alloys.

13. The rotor according to claim 2, wherein the arms (102) extend radially outwardly relative to the central core (101), and wherein a ratio between a width at a base of the arms and a radius of curvature is equal to or less than 1.

14. The rotor according to claim 3, wherein the arms (102) extend radially outwardly relative to the central core (101), and wherein a ratio between a width at a base of the arms and a radius of curvature is equal to or less than 1.

15. The rotor according to claim 4, wherein the arms (102) extend radially outwardly relative to the central core (101), and wherein a ratio between a width at a base of the arms and a radius of curvature is equal to or less than 1.

16. The rotor according to claim 2, further comprising springs (122) positioned inside the receptacles (111) between the outer face of the central core (101) and a face of the permanent magnet (114) facing towards the axis (X) of the rotor (100), wherein the springs (122) assure retention of the permanent magnet (114) inside the receptacle (111) against the rims (105) of the arms of the rotor by exerting by deformation a radial force (F1) on the permanent magnet (114) from the interior towards the exterior of the rotor (100).

17. The rotor according to claim 3, further comprising springs (122) positioned inside the receptacles (111)

between the outer face of the central core (101) and a face of the permanent magnet (114) facing towards the axis (X) of the rotor (100), wherein the springs (122) assure retention of the permanent magnet (114) inside the receptacle (111) against the rims (105) of the arms of the rotor by exerting by deformation a radial force (F1) on the permanent magnet (114) from the interior towards the exterior of the rotor (100).

18. The rotor according to claim 4, further comprising springs (122) positioned inside the receptacles (111) between the outer face of the central core (101) and a face of the permanent magnet (114) facing towards the axis (X) of the rotor (100), wherein the springs (122) assure retention of the permanent magnet (114) inside the receptacle (111) against the rims (105) of the arms of the rotor by exerting by deformation a radial force (F1) on the permanent magnet (114) from the interior towards the exterior of the rotor (100).

19. The rotor according to claim 5, further comprising springs (122) positioned inside the receptacles (111) between the outer face of the central core (101) and a face of the permanent magnet (114) facing towards the axis (X) of the rotor (100), wherein the springs (122) assure retention of the permanent magnet (114) inside the receptacle (111) against the rims (105) of the arms of the rotor by exerting by deformation a radial force (F1) on the permanent magnet (114) from the interior towards the exterior of the rotor (100).

20. The rotor according to claim 1, wherein each of the plates (119) has a width in the orthoradial direction not being equal to the width of each of the permanent magnets (114), and wherein a ratio of the width of each of the plates (119) to the width of each of the permanent magnets (114) is between more than 1 and equal or less than 1.1.

\* \* \* \* \*